April 16, 1935.   J. D. McBURNEY   1,998,054
CINEMA SCREEN
Filed May 20, 1931   2 Sheets-Sheet 1

INVENTOR.
John Dorman McBurney
BY Ralph F. Miller
ATTORNEY

April 16, 1935.  J. D. McBURNEY  1,998,054
CINEMA SCREEN
Filed May 20, 1931   2 Sheets-Sheet 2
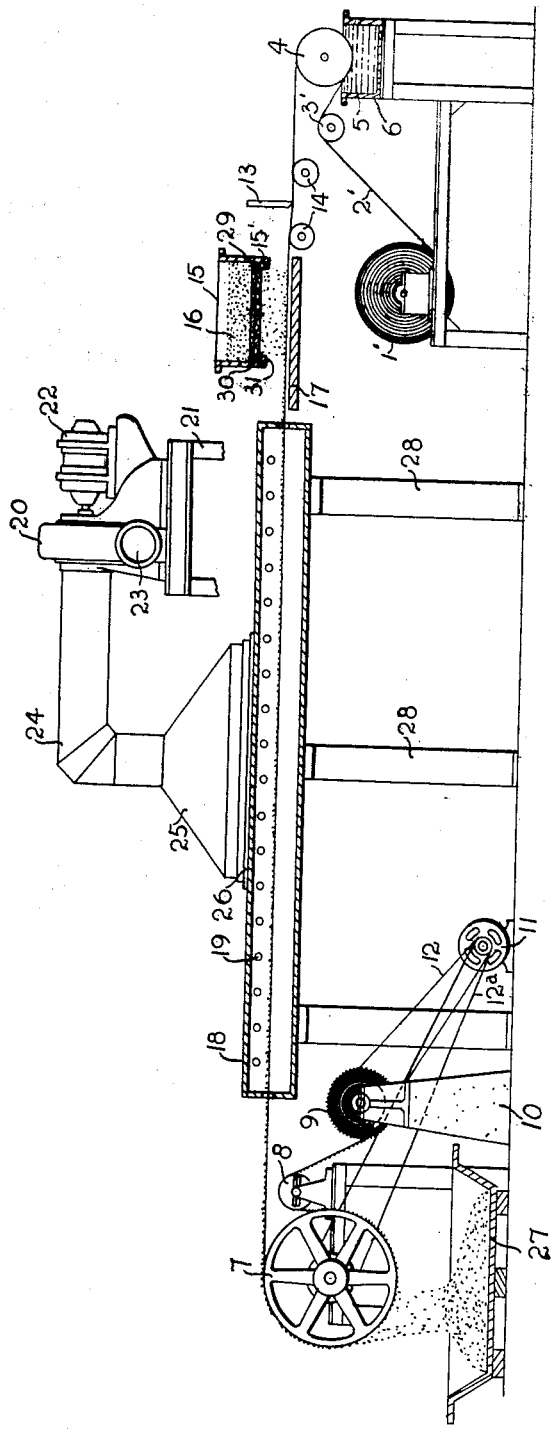
INVENTOR.
John Dorman McBurney
BY Ralph F. Miller
ATTORNEY Patented Apr. 16, 1935

1,998,054

UNITED STATES PATENT OFFICE 1,998,054

CINEMA SCREEN

John D. McBurney, Newburgh, N. Y., assignor to E. I. du Pont de Nemours & Company, Wilmington, Del., a corporation of Delaware Application May 20, 1931, Serial No. 538,861

8 Claims. (Cl. 88—24)

This invention relates to cinema screens and more particularly it relates to screens for colored motion pictures.

It has been proposed to intensify the color effects of colored images by providing the screen with a composite surface of differently colored metal particles, as for instance ground foil colored with the three primary colors, red, yellow and blue. Prior screens of this character have not, however, been wholly effective. Among the defects and disadvantages of these screens there may be mentioned the inferior optical effects produced because of the fact that the differently colored reflecting particles are not maintained in a definite and constant ratio during their application to the surface of the screen. A usual method of applying the small particles to a screen surface has been to sprinkle them indiscriminately upon a freshly japanned or varnished surface, and after the adhesive had thoroughly dried the excess particles were removed by shaking or brushing. This mode of application does not admit of sufficient control when the uniformity of distribution is such an essential requirement. Furthermore, the use of colored metal particles, as has been proposed heretofore has resulting in a screen which lacks certain valuable characteristics which are inherent in a screen surfaced with colored particles of the type more fully referred to hereinafter.

This invention has as an object an improved cinema screen for intensifying the color effects of colored images projected thereon. A second object resides in a process for maintaining a definite and constant ratio of the various colored particles during their application to the screen surface. A third object is a screen which not only gives the narrow angle of reflection suitable for projection in long narrow theatres but which gives exceedingly sharp color effects as compared to metal surfaced and other screens which depend upon a strong degree of surface reflection and low diffusion for reflection within a narrow angle. A fourth object is a screen capable of giving intensified color effects throughout a wide angle and causing a very uniform degree of reflection to be realized throughout practically the entire width of the theatre.

The first and second objects mentioned above are accomplished by the application of a mixture of the appropriately colored reflecting particles on the screen surface by means of a "sieve-valve" as described in connection with the accompanying drawings. The third and fourth objects involve the application to the screen surface of specific forms of glass particles as will more fully appear hereinafter.

The present invention takes advantage of certain theoretical considerations which may be briefly reviewed as follows: If a beam of red light is reflected from a surface consisting of red reflecting particles it appears "redder" than if reflected from a surface of colorless reflecting particles, such as glass beads, or from a white pigmented surface. This results from the absorption of a certain portion of the projected light and the reflection of red having a narrower range of wave length. Thus, even with a sacrifice of intensity, due to absorption, the sensation of a "redder" red is produced. The same applied to a blue beam reflected from a surface of blue reflecting particles, or to a beam of green light reflected from a surface of green reflecting particles. A complete or properly balanced mixture of colored particles, more particularly referred to hereinafter, results in a general increase in the sensation of color, and at the same time give more improved resolution than is commonly realized with the screens or reflecting surfaces now in use.

Fig. 3 illustrates a side view of a mechanism suitable for carrying out the invention.

Figure 1:
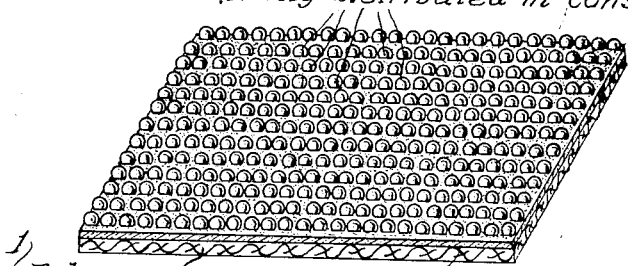
Fig. 1 is a perspective view of an embodiment of my invention.

My improved cinema screen, as shown in Fig. 1, comprises a fabric base 1 and colored glass particles 3 uniformly distributed in constant ratio over the top surface of the fabric. The glass particles are shown magnified in the drawings and are illustrated as spheres adhesively joined to the fabric base 2 by a film of cellulose nitrate which I have found to be a particularly satisfactory adhesive for the present purpose.

The method of making my improved screen will be better understood by reference to Fig. 3 in which the numeral 1' designates the roll of material, such as paper or fabric, to which the glass beads or particles are to be applied. The base material 2' passes over a roller 3' which, together with the roller 4 around which the material passes, serves as a guiding means to direct the material into the adhesive 5 contained in the receptacle 6. After the sheet material 2' passes over the roller 4, it moves in a substantially horizontal plane around a pull roll 7 and over a roller 8 to the windout roll 9, journalled in the support 10. The rolls 7 and 9 are driven by a motor 11 through a belt 12 as shown, and it is by this means that the sheet material 2' is unrolled from the roll 1' and drawn through the mechanism which results in the application of the glass beads or particles to the material. After the sheet material 2' has been dipped into the adhesive 5, by passing around the roller 4, the adhesive is spread and evenly distributed over the material by means of a scraping or doctor knife 13, supported by any suitable means (not shown). The doctor knife 13 bears against the material 2' between two rollers 14. The coated material then passes beneath the receptacle 15 containing the appropriate mixture of colored particles 16 which fall onto the material 2', through screens, in a regulated manner hereinafter described.

A shelf or ledge 17 is placed under the material 2' at the place of the application of the particles in order to prevent the material from sagging. The material, with its coating of evenly distributed mixture of colored reflecting particles, then passes through a drying chamber 18, carried by supports 28 and heated by steam coil 19. The drying chamber is ventilated by means of a fan contained within the housing 20, which is supported by a base 21. The fan, driven by a motor 22, draws air from the openings at each end of the machine through which the material passes, through the funnel-like portion 25 to the conduit 24, and finally through the fan outlet 23. As the particle covered material passes around the pullwheel 7, the excess particles are deposited in the pan 27.

The receptacle for the particles 16 has a screen bottom 29, the mesh of which is just sufficient to allow the particles to pass through. The screen 29 slides on a second screen 30 of substantially the same mesh as the screen 29. The necessary relative motion between the screens 29 and 30, required to permit the passage of particles 16 through the two screens, may be obtained in any desired manner.

In the present embodiment of the invention I have illustrated the screen 30 as the stationary screen having suitable supporting means (not shown). The receptacle 15 is provided with flanges 15' which straddle the frame pieces 31 of the screen 30 and permit the receptacle 15 to be reciprocated over the screen 30.

This screen combination above described may be referred to as a "sieve-valve". The even deposition of the mixture of colored particles in the manner permitted by this valve makes possible the production of a cinema screen having the optical characteristics necessary for the most satisfactory reflection of colored images.

In the case of a number of substances, such as cotton flock or finely ground cork, a single screen is sufficient to support the material when stationary, yet when shaken will permit it to freely pass through. However, the density of metal or glass particles is such that they will pass through a single screen even when stationary, unless the screen is of such fine mesh that the particles cannot be made to pass through even when vigorously shaken. By employing two screens of the proper mesh, however, this can be controlled since the interstices of the screens are blocked except when one of the screens moves over the other. This motion may either be reciprocating or rotary, and the necessary movement of one screen relative to the other may be effected manually, or the movable screen may be connected to the mechanism for driving the sheet material so as to regulate the quantity of the particles deposited with respect to the length of the material 2' which passes in a given time underneath receptacle 15. By this means it has been found that a uniform distribution of the mixed colored particles can be applied continuously to a moving base material. It will be understood, however, that either screen may be the movable one, thus the receptacle may be held stationary and the bottom screen 30 moved in its plane relative to the screen 29.

Several advantages flow from the method of applying the particles as above described. In this connection the application of adhesive by the combined use of the dipping roll 4 and the doctor knife 13 is especially advantageous inasmuch as the application of the adhesive by the use of a knife alone results in the desired anchorage, but due to a very slight unevenness of flow the frequent anchorage of more than one thickness of beads produces a very undesirable optical effect, which is especially disadvantageous when the product is used as a moving picture screen. By the combination of dipping roll and doctor knife herein disclosed, these disadvantages are overcome and a product having the desired optical properties with the beads firmly anchored is produced in a continuous operation.

The type of adhesive found to give best results in connection with the present process may be described as a cellulose nitrate composition containing a suitable solvent softener. The practical operating limits of this formulation and the preferred composition are as follows:

|  | Operating range | Preferred |
| --- | --- | --- |
|  | Per cent | Per cent |
| Cellulose nitrate | 6–12 | 8 |
| Ethyl acetate | 40–70 | 64 |
| Butyl acetate | 10–30 | 20 |
| Tricresyl phosphate | 6–12 | 8 |

Other types of adhesives may be used, as for instance cellulose nitrate lacquers employing other solvent softeners than tricresyl phosphate, such as dibutyl tartrate, acetyl laurins, dibutyl phthalate, butyl lactate, etc. The use of a cellulose nitrate lacquer is likewise not essential as dispersions of other cellulosic derivatives, such as cellulose acetate may also be employed.

Figure 2:
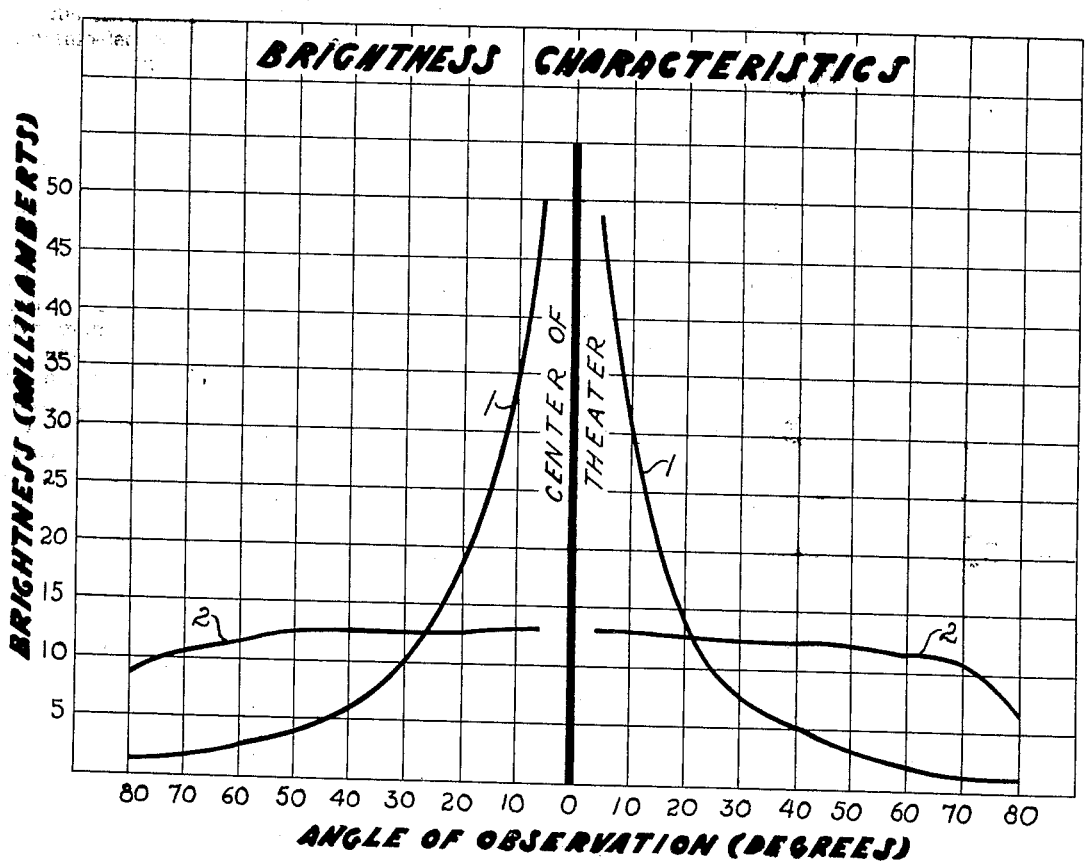
Fig. 2 shows curves by means of which the optical characteristics of my improved screens may be described.

While a screen suitable for reflection of colored images and having improved optical qualities results from the deposition of a mixture of differently colored reflecting particles of metal or of other suitable material through the sieve-valve, I prefer to use various forms of glass particles as I have discovered that their use results in screens having certain valuable and improved optical effects. For a theatre having a long narrow auditorium in which the screen is observed from an angle of less than thirty degrees, I have found that the properties of clear colored glass beads, or particles having curved reflecting surfaces, are advantageous because of the high degree of reflection within the angle mentioned. The curve 1 in Fig. 2 shows the brightness, corresponding to various angles of observation, of the image reflected from a screen covered with clear colored glass beads. It will be seen that as the angle between the center line of the theatre and the point of observation gets larger, the brightness rapidly diminishes. This reflection characteristic results from the second surface reflection of the clear beads on the opaque backing. In other words, the reflecting surface consists of a number of concave surfaces since the light after passing through each bead is reflected from the back concave surface of each bead. The reflection characteristic of screen surfaced with metal particles is also specular but for a different reason, i. e., the low diffusion of metal surfaces coupled with high reflection when viewed from the normal. The clear colored beads are much more effective in the apparent intensification of the colors in the reflected images inasmuch as the light passes twice through each colored element and by the filtering so accomplished light of a given color is thus reflected from the screen in a much narrower wave length range than that corresponding to the projected light.

For the production of a screen capable of narrowing the wave length of the reflected light and capable of giving uniform reflection over a wide angle, as is necessary in theatres having a wide auditorium, I may use opaque glass beads or ground glass. The opaque beads may be opal beads having a smooth vitrified reflecting surface, or they may be beads having an etched or an abraded surface. The opaque glass particles, whether in the form of beads or ground glass, have the reflection characteristic indicated by curve 2. It will be seen from this curve that the brightness of the reflected image is substantially uniform and that there is little diminution of brightness as the angle of observation approaches its extreme limiting value. When the smoothed surfaced opal beads are used the form of the reflection curve results from the fact that the reflecting surface of the screen consists of the convex surfaces of the beads. A reflection characteristic similar to curve 2 can also result from first surface reflection from a matte or light diffusing surface, and it is because of the highly diffusing nature of the reflecting surfaces of the etched beads and ground glass that their reflection characteristic is as indicated by curve 2. The use of the opaque etched glass beads or particles is in some cases more advantageous in producing a highly diffusing surface than the particles of ground glass. It is possible by reason of the diffusion surface provided by the etched or ground glass particles to realize a combination of narrowed wave length with a high degree of reflection throughout a wide angle, a combination which is not realized with screens surfaced with colored metal particles.

The clear and opal beads preferably approximate spheres in shape but they may depart considerably from a true spherical form. The etched beads are also preferably spherical in form but it will be apparent that the form of these beads is not material as their purpose is simply to furnish a highly diffusing reflecting surface. It is preferred to use beads of a size not greater than that of an equivalent sphere 5.0 mm. in diameter nor less than 0.05 mm. in diameter.

Screens may be prepared by the present process which are surfaced with particles of a single color, or with various proportions of differently colored particles. When using a mixture of red, blue and amber particles, the best results are obtained by mixing these particles in the ratio of 1, 5 and 7 parts by weight respectively. It is advantageous in some instances to include a quantity of crystal (colorless) beads in the colored mixture. A very satisfactory mixture containing colorless and colored beads is as follows:

| | Per cent |
|---|---|
| Red | 5 |
| Amber | 20 |
| Green | 20 |
| Blue | 20 |
| Crystal | 35 |

It is to be understood, however, that the desired effects are not limited to the selection and distribution of the colors mentioned, but may be obtained even with two of these or other suitable colors.

Screens produced in accordance with the present process have improved optical qualities, regardless of the kind of colored reflecting particles used, because of the even distribution of the particles in a one layer thickness and because of the application of the particles in definite and constant ratio. The new screens disclosed herein in which the particles constituting the screen surface are glass particles, accomplish optical effects especially marked in the reflection of colored light, particularly in regard to color definition, increase in color sensation and resolution of color.

It will be apparent that my improved process of evenly depositing a mixture of colored particles in constant ratio may be applied as a finish for various articles such as millinery and novelties for the production of improved and unique optical effects when the article is displayed in strong illumination or sunlight.

As many apparently widely different embodiments of this invention may be made without departing from the spirit and scope thereof, it is to be understood that I do not limit myself to the specific embodiments thereof except as defined in the following claims:

I claim:

1. A cinema screen adapted to receive projected colored images and intensify the color effects of the reflected light, said screen having differently colored glass particles uniformly distributed in constant ratio over the surface of the screen.

2. A cinema screen comprising a base carrying a film comprised of cellulose ester composition overlaid with differently colored glass particles uniformly distributed in constant ratio over the surface of the film, said cellulose ester film composition containing a softener and comprising from 33% to 64% cellulose ester.

3. The cinema screen set forth in claim 2 in which the cellulose ester is cellulose nitrate.

4. The cinema screen set forth in claim 1 in which the glass particles are clear glass beads.

5. The cinema screen set forth in claim 1 in which the glass particles are opaque vitrified surfaced glass beads.

6. The cinema screen set forth in claim 1 in which the glass particles are light diffusing.

7. The cinema screen set forth in claim 1 in which the glass particles are ground glass.

8. The cinema screen set forth in claim 1 in which the glass particles are etched beads.

JOHN D. McBURNEY.